US010012210B2

United States Patent
Oh

(10) Patent No.: US 10,012,210 B2
(45) Date of Patent: Jul. 3, 2018

(54) HORIZONTAL-AXIS WIND TURBINE USING AIRFOIL BLADES WITH UNIFORM WIDTH AND THICKNESS

(71) Applicant: Young-Lok Oh, Daejun (JP)

(72) Inventor: Young-Lok Oh, Daejun (JP)

( * ) Notice: Subject to any disclaimer, the term of this patent is extended or adjusted under 35 U.S.C. 154(b) by 0 days.

(21) Appl. No.: 14/346,630

(22) PCT Filed: Sep. 19, 2012

(86) PCT No.: PCT/KR2012/007498
§ 371 (c)(1),
(2) Date: Mar. 21, 2014

(87) PCT Pub. No.: WO2013/042937
PCT Pub. Date: Mar. 28, 2013

(65) Prior Publication Data
US 2014/0234107 A1    Aug. 21, 2014

(30) Foreign Application Priority Data

Sep. 21, 2011  (KR) .................. 10-2011-0095409
May 17, 2012  (KR) .................. 10-2012-0052457

(51) Int. Cl.
F03D 7/02       (2006.01)
F03D 1/06       (2006.01)
F03D 7/04       (2006.01)

(52) U.S. Cl.
CPC ............. *F03D 7/0224* (2013.01); *F03D 1/06* (2013.01); *F03D 1/0633* (2013.01);
(Continued)

(58) Field of Classification Search
CPC .... F03D 1/0675; F03D 1/0683; F03D 1/0633; F03D 1/0641; F03D 7/0224
See application file for complete search history.

(56) References Cited

U.S. PATENT DOCUMENTS 2,985,245 A    5/1961  Maloof
4,844,698 A *  7/1989  Gornstein et al. ........ 416/223 R
(Continued)

FOREIGN PATENT DOCUMENTS

DE    19526718 A1    1/1997
JP    57083672 A     5/1982
(Continued)

OTHER PUBLICATIONS

"Predicted Aerodynamic Characteristics of Typical Wind Turbine Airfoils Using CFD", Wolfe, Walter; Sep. 1997.*
Korean Notice of Allowance dated May 9, 2013.
International Search Report for PCT/KR2012/007498 dated Feb. 1, 2013.
Written Opinion for PCT/KR2012/007498 dated Feb. 1, 2013.
(Continued)

*Primary Examiner* — Justin Seabe
(74) *Attorney, Agent, or Firm* — Hauptman Ham, LLP

(57) ABSTRACT

A horizontal-axis wind turbine using airfoil blades with uniform in width and thickness, comprising a tower installed vertically from ground surface, a nacelle rotatable connected to center of a vertical axis on top of the tower, a rotating body axially bonded to the nacelle, and one or more blades connecting and forming a pitch angle on the outer periphery of the rotating body, and the blade having an airfoil shape and having uniform in width and thickness in a longitudinal direction and generating torque from lift about a tip of the blade is provided.

6 Claims, 18 Drawing Sheets

(52) U.S. Cl.
CPC ............. *F03D 1/0641* (2013.01); *F03D 7/04* (2013.01); *F03D 7/041* (2013.01); *F03D 7/042* (2013.01); *F05B 2250/72* (2013.01); *F05B 2250/73* (2013.01); *F05B 2260/502* (2013.01); *F05B 2260/503* (2013.01); *F05B 2260/71* (2013.01); *F05B 2260/75* (2013.01); *F05B 2260/76* (2013.01); *F05B 2260/79* (2013.01); *F05B 2270/32* (2013.01); *Y02E 10/721* (2013.01); *Y02E 10/723* (2013.01); *Y02E 10/726* (2013.01)

(56) References Cited

U.S. PATENT DOCUMENTS

| | | | | |
|---|---|---|---|---|
| 6,030,179 | A | * | 2/2000 | McCabe ........................ 416/237 |
| 7,182,575 | B2 | * | 2/2007 | Grabau ................. F03D 7/0224 |
| | | | | 416/1 |
| 8,899,921 | B2 | * | 12/2014 | McCune ........................... 416/1 |
| 2003/0077178 | A1 | * | 4/2003 | Stearns ................. F03D 1/0675 |
| | | | | 416/223 R |

FOREIGN PATENT DOCUMENTS

| | | |
|---|---|---|
| JP | S57121774 A | 7/1982 |
| JP | S58140485 A | 8/1983 |
| JP | S58200083 A | 11/1983 |
| JP | S59043988 A | 3/1984 |
| JP | S63-192968 | 8/1988 |
| JP | H07-324675 | 12/1995 |
| JP | 2011032918 A | 2/2011 |
| KR | 100946347 B1 | 3/2010 |
| KR | 1020100086557 A | 8/2010 |

OTHER PUBLICATIONS

Japanese Office Action dated Sep. 16, 2014 in connection with the corresponding Japanese Application No. 2014-531712.

European search report dated Apr. 9, 2015 in connection with the corresponding European Application No. 12834384.5.

Notice of Allowance dated Mar. 8, 2016 from Japanese Patent Office in connection with the corresponding Japanese Application No. 2014-531712.

* cited by examiner

HORIZONTAL-AXIS WIND TURBINE USING AIRFOIL BLADES WITH UNIFORM WIDTH AND THICKNESS

CROSS REFERENCE TO RELATED APPLICATION

This application is a PCT-NATIONAL PHASE Application of International Application No. PCT/KR2012/007498 filed on Sep. 19, 2012 which claims the priority of Korean Patent Application No. 10-2011-0095409 filed on Sep. 21, 2011 and Korean Patent Application No. 10-2012-0052457 filed on May 17, 2012 in the KIPO (Korean Intellectual Property Office), the disclosures of which are incorporated by reference herein in their entirety.

TECHNICAL FIELD

The present invention relates to a wind turbine, and more particularly a horizontal-axis wind turbine having increased efficiency of power generation and operating efficiency by using torque from lift generated from wind coming into contact with a blade and by using airfoil blades with a uniform in width and thickness.

BACKGROUND ART

As greenhouse gas generating from fossil fuel is pointed out and blame as an element causing global warming, United Nations Framework Convention on Climate Change was adopted to prevent global warming in a worldwide basis, and various programs are being implemented to contain these greenhouse gas emissions. Our country is also faced with the reality to find a solution to reduce greenhouse gas emissions and take various measures to reduce use of fossil energy.

For this reason, new renewable energy, which is defined as a new energy source replacing fossil fuel such as oil, coal, nuclear, natural gas, etc., is receiving recognition, and new renewable energy refers to, and incorporating, energy using new energy such as coal to liquid, hydrogen energy, etc. and animal, plants, organic matter, sunlight, wing, water, geothermal heat, etc. to transform to an eco-friendly and renewable energy.

These new & renewable energy has advantages of being renewable, eco-friendly, and unlimited, but has issues of continuous research and development for increase in efficiency and overcoming current uncertain market forecasts.

Wind power generation, which is one of the new renewable energy using wind, is a technology that uses aerodynamic characteristics of kinetic energy of air flow to rotate a rotor to transform to mechanical energy, and generates electrical energy from this mechanical energy.

Wind power generation field is an industry recently emerging as an alternative energy source and sustaining high growth, and growth is accelerating due to obligations for worldwide greenhouse gas reduction, lower power generation costs from technological advancements, etc.

Since wind power generation uses unlimited pollution free wind scattered everywhere, effects on environment is small, territory may be used efficiently, and in the case of power generation costs for large scale power plants, it is a very useful power generating method without decrease in efficiency compared to prior power generating methods.

However, since power generation is difficult when energy density is low due to lack of wind, it should be installed restricted to certain areas, and since power generation is only able when a required amount of wind exist, equipments such as storage devices, etc. are needed for stable supply of electricity, and problems of noise generating from recent enlargement of wind power generators exist, and disadvantages of high initial investment costs exist.

Structure of prior wind turbines are composed of a high-rise tower erected on the ground, a nacelle installed on top of the tower, and a rotation axis combined with the nacelle and a number of blades installed on the surface of the outer circumference of the rotation axis, and an acceleration unit, power generator, control device, etc. is placed inside the nacelle so that the torque of the blade reaches the power generator through the rotation axis.

In this instance, the blade generally forms a pitch angle of 30° with a hub section, where it is coupled with the rotation axis, and pitch angle of about a 2°~3° with the tip section, and is formed in a twisting fashion and also in a shape where the width and thickness gradually becomes narrower and thinner. In this case, the blades rotate when a blades with a pitch angle receives wind blowing on the front slantly and naturally passes it through to the back of the rotating surface of the blade and generates drag, and at the same time lift is generated in the end section of the blade in respect to the rotation of the blade and thus torque of the blade is improved. That is, since energy is transferred to a blade when wind blowing to a rotating surface of a blade passes through a rotating surface, velocity of wind reduces to about ⅔, and thus maximum of 59.26% (Betz Law) of flow energy of wind converts to rotation power.

But, since wind turbines mentioned above have a structure transferring rotation power to a blade when wind passes through a rotating surface of a blade, wind velocity decreases after wind passes through a blade, and since amount of energy corresponding to the decreased velocity of flow energy of wind converts to torque, it is limited in that efficiency of power conversion (Cp) is not high. For this reason, it may be properly applied to large sized wind turbines with lower share of base loads, but with small sized generators, which do not, efficiency of power conversion (Cp) relatively falls below about 30% and problems of decreased power generation output arise.

Also, prior wind turbines possess problems of decreased efficiency of usage in low wind velocity domains because required starting wind velocity is high due to structural characteristics of a blade. Specifically, taking into account that frequency of low wind velocities below 4 m/s account for more than 60% when examining frequency distribution classified by wind velocity for annual winds, issues of actual operating efficiency of wind turbines being very low exist.

DISCLOSURE

Technical Problem

The present invention is provided to solve the problems of prior arts, and to provide a wind turbine with high efficiency of power generation and operating efficiency by improving power conversion efficiency (Cp) by using airfoil blades with uniform in width and thickness.

Also, the present invention is provided to provide a wind turbine improving efficiency of power generation and securing safety in very strong winds by having a structure that may adjust pitch angles according to wind velocities even for small sized wind turbines.

Also, the present invention is provided to reduce noise and vibration from prior power generation methods by using upwind method, which uses a tail wing that may maintain its position in the direction where wind is blowing, and using a downwind method, which is without a tail wing and does not pass wind through but repels to an outer radius.

It should be understood that the technical problems the present invention is provided to solve is not limited to the described technical problems, and other technical problems not described will be apparent to those skilled in the art from the embodiments of the present invention.

Technical Solution

In accordance with the present invention to solve the problems of the described prior arts, a horizontal-axis wind turbine using airfoil blades with uniform in width and thickness, comprising a tower installed vertically from ground surface, a nacelle rotatable connected to center of a vertical axis on top of the tower, a rotating body axially bonded to the nacelle, and one or more blades connecting and forming a pitch angle on the outer periphery of the rotating body, and the blade having an airfoil shape and having uniform in width and thickness in a longitudinal direction and generating torque from lift about a tip of the blade is provided.

The blade according to the present invention having symmetrical shapes of top surface and bottom surface shapes, and generating torque from lift from both sides of the top surface and the bottom surface.

The blade according to the present invention may have asymmetrical top surface and bottom surface shapes.

The present invention preferably forms the pitch angle to 0° so that wind collides with a rotating surface formed by the rotation of the blade and is guided to the circumferential border of the rotating surface when the blade rotates, and converts the flow energy of the wind to rotation power.

The present invention preferably further comprises a wind velocity plate coupled with a surface facing wind of the rotating body and having a horizontal linear motion corresponding to wind velocity, a coil spring formed on a surface not facing wind of the wind velocity plate and adjusting the horizontal linear motion of the wind velocity plate, and a $1^{st}$ gear formed on a surface not facing wind of the wind velocity plate and formed to have a horizontal linear motion at the same time with the wind velocity plate, and a $2^{nd}$ gear formed on the hub of the blade and formed to have a circular motion interlocked with the $1^{st}$ gear, and the $2^{nd}$ gear rotates according to a horizontal linear motion of the $1^{a}$ gear and the wind velocity plate and is able to vary pitch angles of the blade.

The present invention preferably further comprises a pitch angle adjusting motor coupled with the rotating body, and a $3^{rd}$ gear connected to the pitch angle adjusting motor and transferring power to the blade, and the $3^{rd}$ gear rotates according to a rotation amount adjustment from the pitch angle adjusting motor and is able to vary pitch angles of the blade.

The present invention preferably further comprises a wind velocity detecting sensor on one side of the tower.

The present invention preferably further comprises a tail wing coupled with a back side of the nacelle and generating power in an upwind method, where wind faces the blade before the tower.

Advantageous Effects

According to the present invention having configurations described above, as blades applied to a wind turbine has airfoil shapes with uniform width and thickness, not only does torque improve from lift and thrust generating from a wide area of the blade, but also torque may increase as wind does not pass through the rotating surface formed by setting pitch angles of blades to 0° and converts stored flow energy to rotation power.

Also, as pitch angles are made to be variable, efficiency of power generation may improve and safety may be secured by using appropriate pitch angles according to wind velocities.

Also, noise and vibration due to prior power generation methods may be reduced regardless of existence of tail wings.

And, since high torque is generated even in low wind velocities, utility is excellent as it may be installed in locations with high frequency of low wind velocities, and thus operating efficiency of a power generator may be improved.

BEST MODE

Hereinafter, embodiments of the invention will be described in detail with reference to accompanying drawings.

Figure 1:
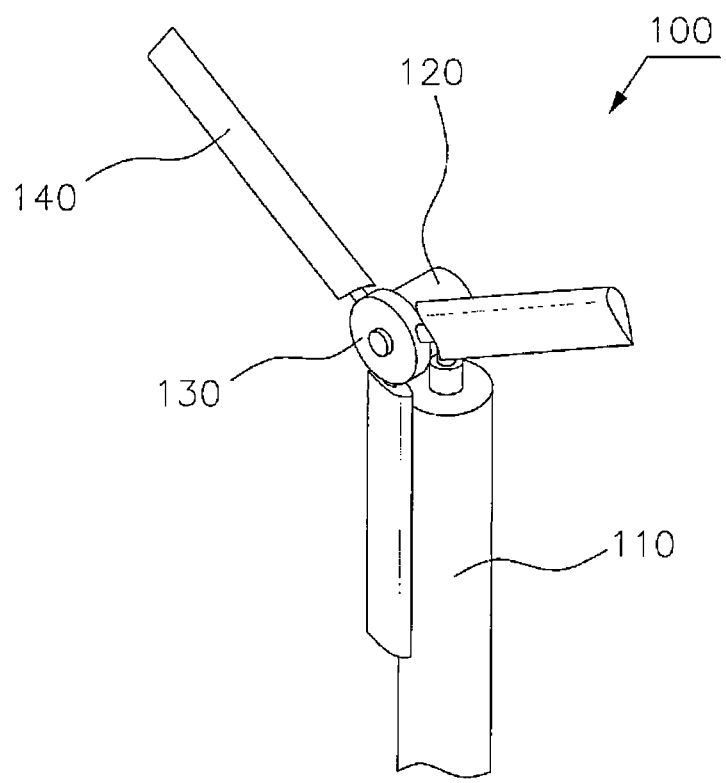
FIG. 1 is a perspective view of a wind turbine using airfoil blades with uniform in width and thickness according to an embodiment of the present invention.

FIG. 1 is a perspective view of a wind turbine using airfoil blades with uniform width and thickness according to an embodiment of the present invention.

As shown in FIG. 1, a horizontal-axis wind turbine 100 using airfoil blades with uniform width and thickness of the present invention comprises a tower 110 installed vertically from ground surface, a nacelle 120 rotatable connected to center of a vertical axis on top of the tower 110, a rotating body 130 axially bonded to the nacelle 120, and one or more blades 140 connecting and forming pitch angles on the outer periphery of the rotating body 130, and the blade 140 having an airfoil shape with uniform width and thickness in a longitudinal direction. This is to generate torque from lift about a tip of the blade 140.

The horizontal-axis wind turbine 100 using airfoil blades with uniform width and thickness use a method where mechanical energy is generated when the rotating body 130 rotates from rotation power generated when wind comes in contact with the blade 140.

Figure 2:
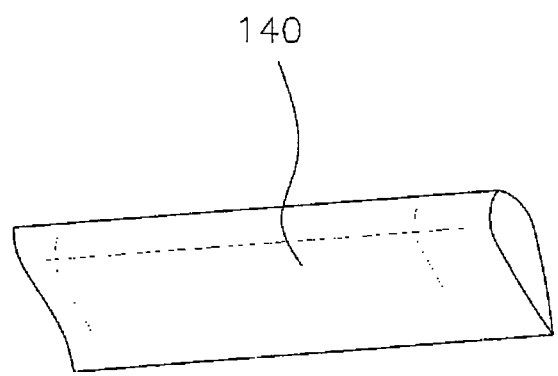
FIG. 2 is a perspective view of an airfoil blade with uniform width and thickness according to an embodiment of the present invention.
Figure 3:
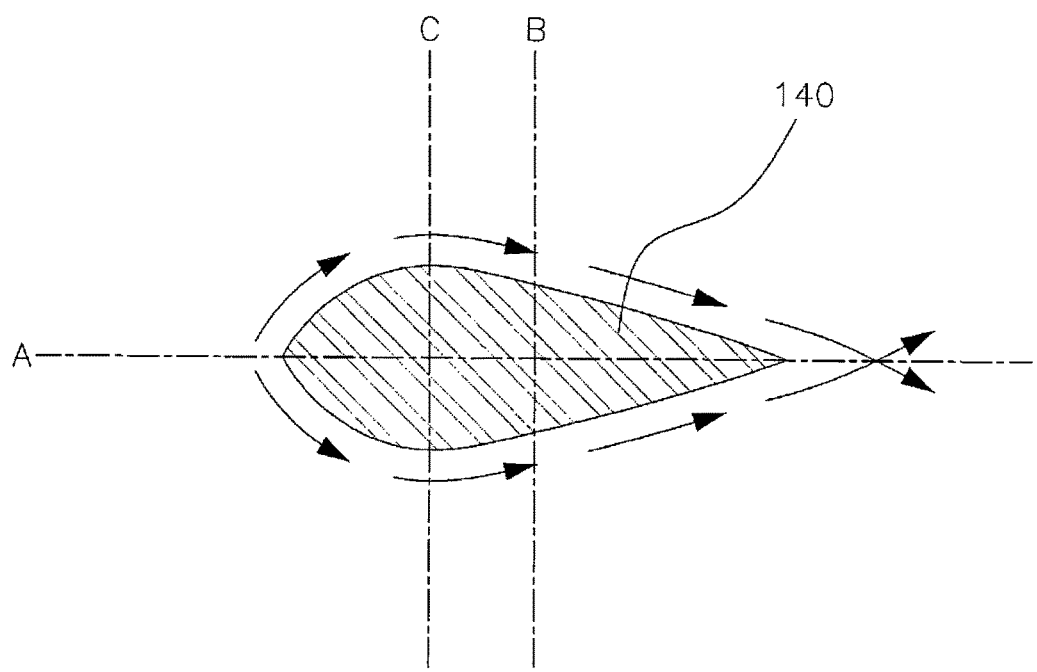
FIG. 3 is a cross-sectional view of a symmetrical airfoil blade with uniform width and thickness according to an embodiment of the present invention.

FIG. 2 is a perspective view of an airfoil blade with uniform width and thickness according to an embodiment of the present invention, and FIG. 3 is a cross-sectional view of a symmetrical airfoil blade with uniform width and thickness according to an embodiment of the present invention.

As shown in FIG. 2, the blade 140 is uniform width and thickness, and shaped similar to an airfoil shape of an airplane wing. And in a longitudinal section of a blade 140 shown in FIG. 3, according to line A passing the center of the cross section, one can identify that upper surface and lower surface is formed in a symmetrical shape with a same curved shape. But, according to line B passing the center, it is not a symmetrical shape, and it is most thick where C line passes, about ¼ distance from the end of one side.

However, blade 140 having uniform width and thickness of the present invention may be formed in a symmetrical shape with same curved shapes, or formed in an asymmetrical shape with small differences.

Therefore, the blade 140 divides wind through rotation, and the divided wind flows fluidly along an upper surface and a lower surface, and in this instance, a great amount of wind flows on both side of the blade 140 and generates lift, and thus torque is generated.

Eventually, in the case of prior wind turbines, torque is generated on one side of a blade, but issues of low torque and low amount of power generation exist because the probability of lift and thrust therefrom generated in an opposite side is low, but blades 140 with symmetrical airfoil shape of the present invention generates lift and thrust from both sides and may achieve effects of greatly improving torque and amount of power generation compared to prior wind turbines. These lift and thrust increase proportional to the rotation of the blade 140.

Also, the blade 140 is formed with uniform width and thickness along a longitudinal direction, and generating a uniform lift and thrust in a wide range of area is preferable, and this has an effect of further increasing torque.

That is, wind turbines generate thrust from lift corresponding to an interaction between high speed air flow and blades at about 30% area from the tip of a blade, but width of this area is narrow in prior blades and as a result the area ratio is relatively low and efficiency of power conversion (Cp) is low, but in the present invention, width and thickness of the whole blade 140 is uniform and area ratio interacting with air flow at the tip is relatively high and thrust from lift is greatly generated and its efficiency may be improved. Results of flow analysis is illustrated in FIG. 9 to FIG. 12, and described in detail below.

Also, the blade 140 rotates with pitch angles adjusted to 0° and may form a rotating surface, for this reason it does not pass wind blowing in through but guides to the circumferential border of the rotating surface and the velocity of the wind further increases and is more effective in converting flow energy of the wind to rotation power.

Figure 4:
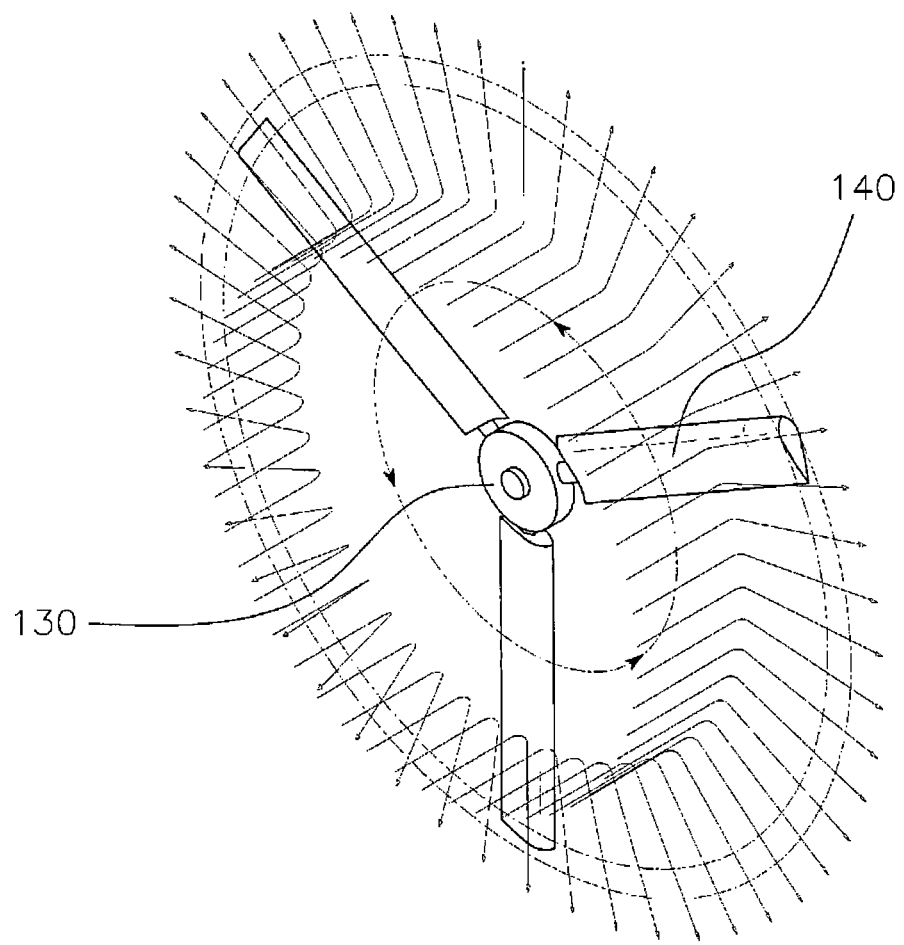
FIG. 4 is a perspective view showing rotation surface of a blade and flow of wind according to an embodiment of the present invention.

That is, as illustrated in FIG. 4, round shaped rotating surface is formed when the blade rotates in high speeds with pitch angles adjusted to 0°, wind coming in is blocked by the rotating surface and may not pass through, and is pushed to the circumferential border of the rotating surface by the wind continuously coming in. Therefore, velocity of wind further increases and force where flow energy is converted to rotation power increases, and thus rotating velocity of blades 140 further increase and as a result high power generation output may be achieved.

Meanwhile, it has a structure where pitch angle, which is formed by a rotating surface formed when the blade 140 and the blade 140 rotates. Generally, the pitch angle varies within a range of $0° \neq 30°$, and in the present invention, pitch angles are maintained to 0° to improve efficiency of power generation and operating efficiency, and when an ultrafast wind that may damage a wind turbine blows in, pitch angles are increased to guide the wind to pass through the rotating surface and plays a role of making safe power generation possible.

Also, pitch angles may be varied to achieve efficient torque in respect to change in wind velocity. A variety of pitch angles may be used for efficient operation of a wind turbine such as adjusting pitch angles to about 30° for low wind velocities, and gradually decreasing the pitch angles to about 0° when low wind velocities transforms to high wind velocities.

Figure 5:
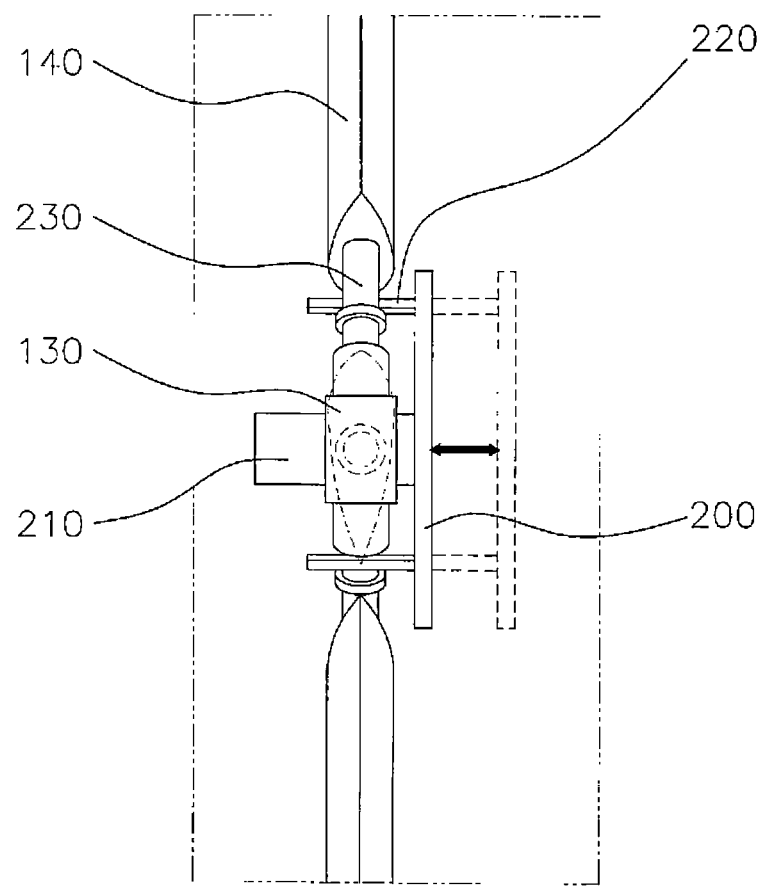
FIG. 5 is an exemplary view showing a structure able to vary pitch angles comprising a wind velocity plate, $1^{st}$ gear, and $2^{nd}$ gear according to an embodiment of the present invention.

FIG. 5 is an exemplary view showing a structure able to vary pitch angles comprising a wind velocity plate, $1^{st}$ gear, and $2^{nd}$ gear according to an embodiment of the present invention.

As shown in FIG. 5, to make variation of pitch angles of the blade 140 possible, the present invention further comprises a wind velocity plate 200 coupled with a surface facing wind of the rotating body 130 and having a horizontal linear motion corresponding to wind velocity, a coil spring 210 formed on a surface not facing wind of the wind velocity plate 200 and adjusting the horizontal linear motion of the wind velocity plate 200, and a $1^{st}$ gear 220 formed on a surface not facing wind of the wind velocity plate 200, and a $2^{nd}$ gear 230 formed on the hub of the blade 140 and formed to have a circular motion interlocked with the $1^{st}$ gear 220, and the $2^{nd}$ gear 230 rotates according to a horizontal linear motion of the $1^{st}$ gear 220 and the wind velocity plate 200 and is able to vary pitch angles of the blade 140.

This is a method, while the wind velocity plate 200 and 1st gear 220 are in a horizontal linear motion by action of the coil spring 210, adjusting pitch angles by rotating a 2nd gear 230, which is in a circular motion interlocked with the 1st gear 220.

Again, the wind velocity plate 200 moves forward in a horizontal linear motion at low wind velocities, and the wind velocity plate 200 moves backward in a horizontal linear motion due to wind pressure at high wind velocities, in this instance, 2nd gear 230 interlocked with the 1st gear 220 rotates and increases pitch angles when the wind velocity plate 200 moves forward in a horizontal linear motion, and 2nd gear 230 interlocked with the 1st gear 220 rotates in an opposite direction and decreases pitch angle when the wind velocity plate 200 moves backward in a horizontal linear motion.

Therefore, high efficiencies of power conversion and stability may be achieved by maintaining pitch angles adequate for each wind velocity with pitch angles varying automatically according to changes in wind velocity without additional operation from a user.

Figure 6:
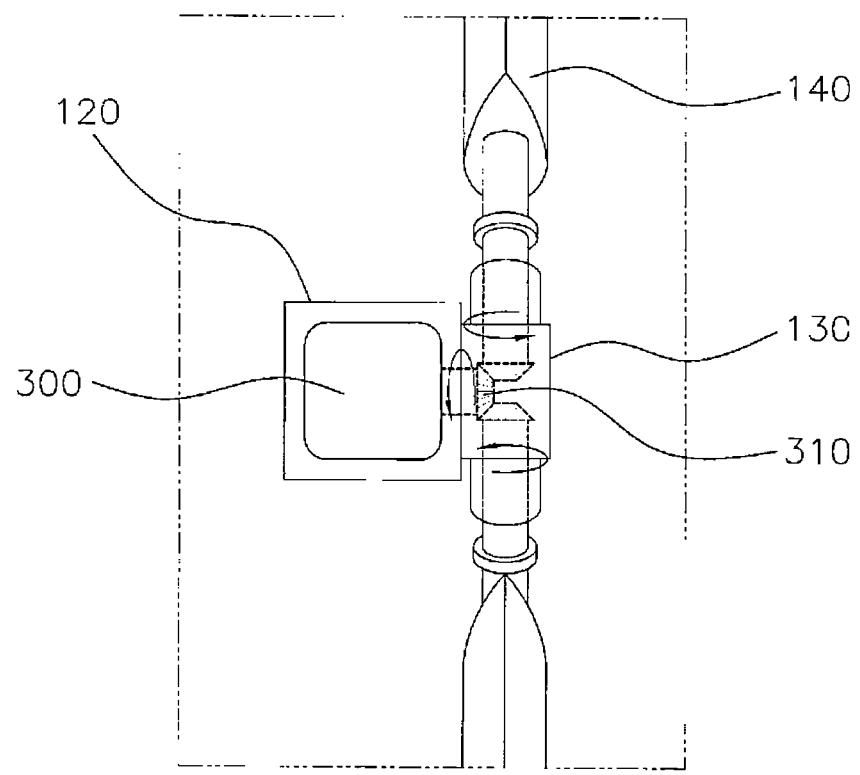
FIG. 6 is an exemplary view showing a structure able to vary pitch angles comprising a pitch angle adjusting motor and a $3^{rd}$ gear according to an embodiment of the present invention.

FIG. 6 is an exemplary view showing a structure able to vary pitch angles comprising a pitch angle adjusting motor and a $3^{rd}$ gear according to an embodiment of the present invention.

Contrary to the structure of FIG. 5 using a wind velocity plate 200 to vary pitch angles, the present invention illustrated in FIG. 6 that makes it possible for pitch angle variation further comprises a pitch angle adjusting motor 300 coupled with the rotating body 130, and a 3rd gear 310 connected to the pitch angle adjusting motor 300 and transferring power to the blade 140, and the 3rd gear 310 rotates according to a rotation amount adjustment from the pitch angle adjusting motor 300 and has a structure able to vary pitch angles of the blade.

That is, in this case, system senses wind velocities and activates the pitch angle adjusting motor 300, and a desired and adequate pitch angle may be formed from rotation of a 3rd gear 310 connected to the pitch angle adjusting motor 300, and the number of 3rd gear 310 is preferably formed with the same number of blades 140 requiring pitch angle adjustment.

To adjust pitch angles using the pitch angle adjusting motor 300, current wind velocities blowing into a wind turbine should be identified, and the present invention may further comprise a wind velocity detecting sensor on one side of the tower 110. A variety of methods for adjusting pitch angle may be used such as a system connected to the wind velocity detecting sensor and able to automatically control pitch angles may be equipped, or activating a pitch angle adjusting motor 300 by referring to current wind velocities acquired from the wind velocity detecting sensor, etc.

Figure 7:
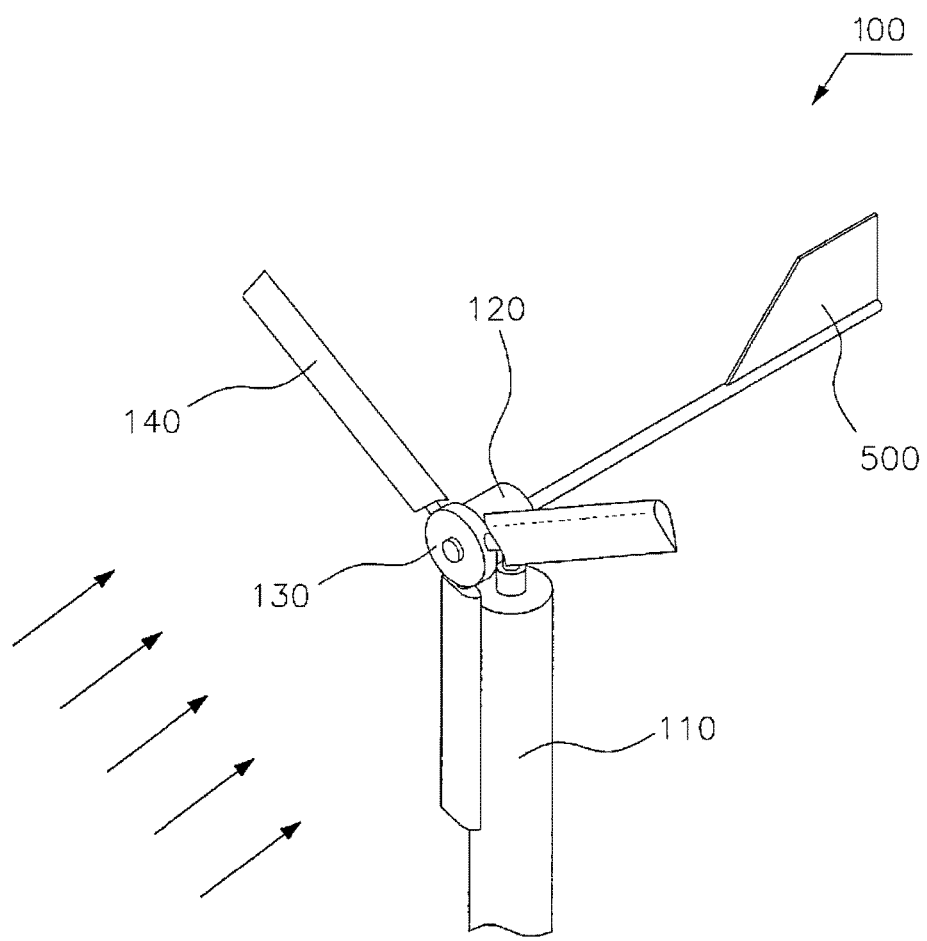
FIG. 7 is a perspective view of a wind turbine using airfoil blades with uniform width and thickness according to an embodiment of the present invention further comprising a tail wing according to an embodiment of the present invention.
Figure 8:
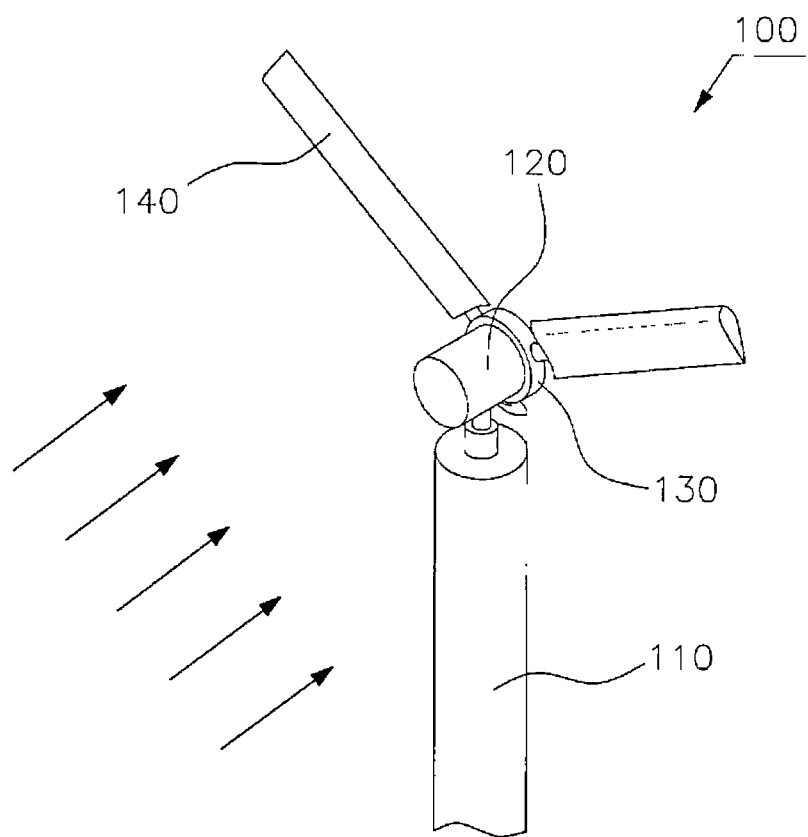
FIG. 8 is a perspective view of a wind turbine using airfoil blades with uniform width and thickness according to an embodiment of the present invention not comprising a tail wing according to an embodiment of the present invention.

FIG. 7 is a perspective view of a wind turbine using airfoil blades having uniform width and thickness according to an embodiment of the present invention further comprising a tail wing according to an embodiment of the present invention, and FIG. 8 is a perspective view of a wind turbine using airfoil blades having uniform width and thickness according to an embodiment of the present invention not comprising a tail wing according to an embodiment of the present invention.

As illustrated in FIG. 7, a tail wing 500 coupled with the back side of the nacelle 120 is further comprised, and power may be generated in a method where wind faces blades 140 before a tower 110. The tail wing 500 is for the rotating body 130 to always face the direction of wind blowing in by detecting the direction where wind blows in, and this power generation method is called upwind method, and an opposite downwind method is a power generation method where wind faces a tower 110 before blades 140.

A downwind method illustrated in FIG. 8 does not require a tail wing 500 and therefore possess advantages of being able to reduce production costs and simplify manufacturing methods. In the case of general wind turbines, turbulence or vortex are formed when wind first passes through a tower and flows to blades, and upwind method is selected to avoid vibration and noise generating from inflow of wind to a rotating surface. But, since the present invention sets the pitch angle to 0° so that wind, when the blade rotates, collides with a rotating surface formed by the rotation of the blade and is guided to the circumferential border of the rotating surface and obtains energy, rotating surface assumes the role of a tail wing 500, generation of turbulence or vortex is low even though wind passes through a tower 110 first and it has advantages of minimizing vibration and noise from this problem.

Therefore, the present invention, by using blades 140 with airfoil shapes with uniform width and thickness, both downwind method not requiring a tail wing 500 and an upwind method comprising the tail wing 500 may be used to generate power, and a more efficient and effective power generation system may be formed when a power generation method is selected taking wind characteristics, space characteristics, surrounding environments, etc. of the location of installation into account.

Meanwhile, a wind tunnel experiment and CFD numerical analysis were performed to indentify the actual efficiency of power generation of the horizontal-axis wind power generator applying the technical structure of the present invention.

Figure 20:
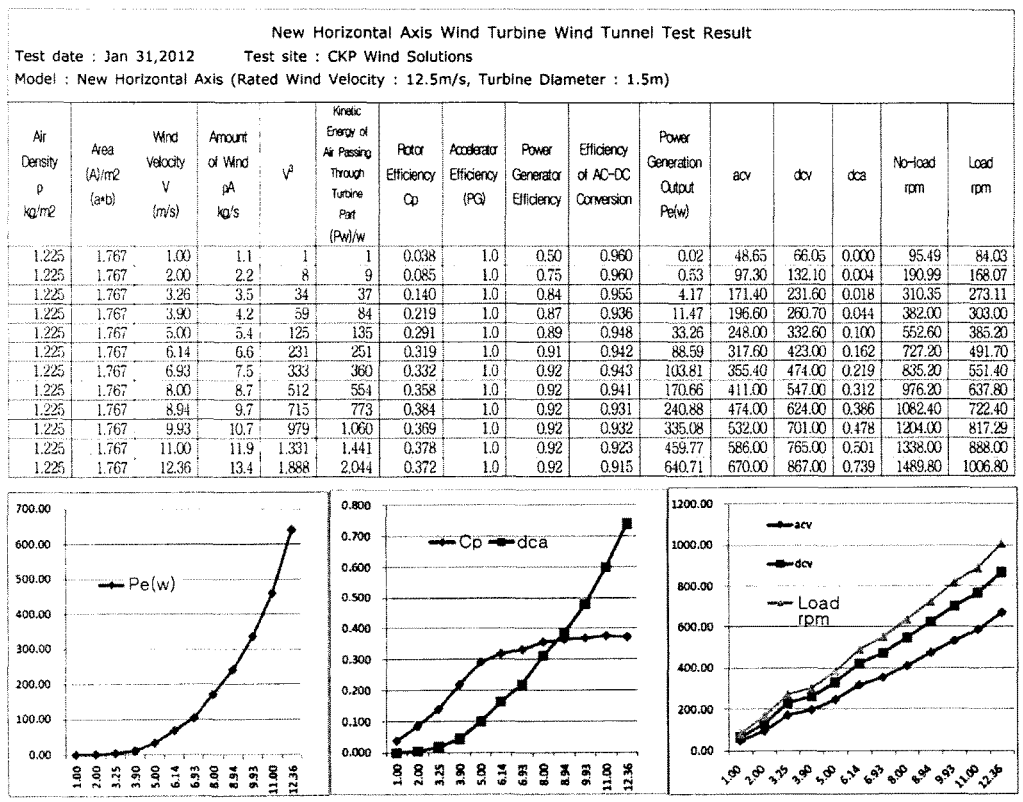
FIG. 20 shows the wind tunnel experiment results of an exemplary wind turbine according to some embodiments.

First, wind tunnel experiment was performed on Jan. 1, 2012 with conditions in table 1, and the results are shown in FIG. 20.

TABLE 1

| Classification | | | | Product Specification | | Note |
|---|---|---|---|---|---|---|
| Small | rotor | Diameter | 1.5 m | Area Rotor | 1.77 m² | |
| Sized | | Length of blade | 0.74 m | Maxium Rotation Velocity | 2,000 RPM | |
| Wind Turbine System | | Weight | 0.356 kg | Rated Rotation Velocity | 1.200 RPM | |
| | | Number of blade | 3 | Range of Rotation Velocity | 0 RPM~ 1,500 RPM | |
| | | Material | Wooden | Type of air foil | Symmetric cross section | |

TABLE 1-continued

| Classification | | | Product Specification | | Note |
|---|---|---|---|---|---|
| Generator | Rate Output | 400 W | Phase | ☐1■3☐DC | |
| | Rated Velocity | 380 RPM | Rated Voltage | 220 Vac | |
| | Number of Poles | 20 | Rated Curent | 1.35 A | |
| | Type | AFPM | Rated Frequency | 60 Hz | |
| | Range of Velocity | 0~500 RPM | Weight | 11 kg | |
| | Excitation Control | | ☐External☐ Self■ Permanent Magnet Type | | |
| Controler | Rated Output | Kw | Output Type | ☐DC☐AC | |
| | Rated Input | Phase Va | Rated Output | Phase Va | |
| | Input Frequency | Hz~Hz | Output Frequency | Hz~Hz | |
| | Over Output Control Method | | Over Voltage Control method | | |
| | Storage Battery Charge Voltage System Control Method | DC 12 V | Size | (H) * (D) * (L) | |

As can be identified in the results of the experiment, power generation output and efficiency of power conversion (Cp) increase as wind velocity and amount of wind increase. Taking a more detailed examination, power generation output shows tendency of increasing in a greater span in respect to increase in wind velocity, and efficiency of power conversion (Cp) increase proportional to wind velocity for wind velocities below about 5 m/s, but it increases in stronger winds but shows a tendency of low rate of increase.

Also, power generation output of 4.17 W and efficiency of power conversion (Cp) of 0.140 for wind velocity of 3.25 m/s, power generation output of 11.47 W and efficiency of power conversion (Cp) of 0.219 for wind velocity of 3.90 m/s may be identified.

That is, the present invention has a uniform amount of power generation output and efficiency of power conversion (Cp) even in low wind velocities below 4 m/s and thus effectively increasing operating efficiency of a wind turbine. CKP Wind Solutions, which conducted the wind tunnel experiment, evaluated the present invention as "This is a wind turbine system with advantages of generating a good torque from angle of attack of approaching wind velocity and rotating blade when reaching a constant RPM, and expect good output performance."

The power generation output of the wind tunnel experiment is an actual measurement value, rotor efficiency is a calculated value applying efficiency of power generator and efficiency of rectifier conversion, and will be compared with result values of CFD numerical analysis later.

The CFD numerical analysis performed next was performed using CFX ver 13.0, which is a commercial code, for 3 dimension flow analysis and performance evaluation.

A blade 140 having a symmetrical airfoil shape formed with same width and thickness with a length of 0.75 m (diameter of rotating surface of a blade is 1.5 m), chord length (blade width) of 0.09 m was used for the CFD numerical analysis, and cross-section of a blade 140 is as illustrated in FIG. 3, and has a characteristic of having the most thick thickness at a location ¼ from end of one side of a cross-section.

Also, a blade (referred to as 'Embodiment 1' below) with a thickness of 1.8 cm at the most thick location, a blade (referred to as 'Embodiment 2' below) with a thickness of 1.2 cm at the most thick location, and a blade (referred to as 'Embodiment 2' below) with a thickness of 2.1 cm at the most thick location from a same shaped blade 140 was compared and analyzed.

First, a streamline of a surface according to wind velocities of symmetrical airfoil blades having same width and thickness is shown in FIG. 9 to FIG. 12.

Figure 9:
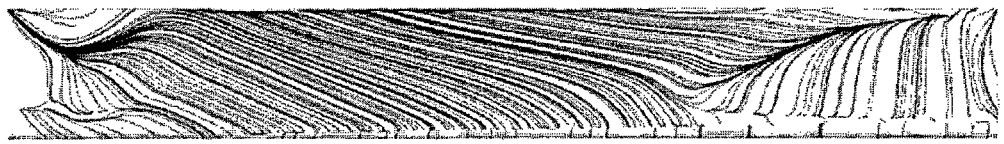
FIG. 9 to FIG. 12 are results of CFD interpretation showing a streamline of a surface according to wind velocities of a symmetrical airfoil blade with uniform width and thickness.
Figure 10:
Figure 11:
Figure 12:

FIG. 9 shows a streamline of a surface at wind velocity of 3.9 m/s, rotation speed of 303 rpm, and tip velocity ratio of 6.10, FIG. 10 shows a streamline of a surface at wind velocity of 6.14 m/s, rotation speed of 491.7 rpm, and tip velocity ratio of 6.29, FIG. 11 shows a streamline of a surface at wind velocity of 9.93 m/s, rotation speed of 817.29 rpm, and tip velocity ratio of 6.46, FIG. 12 shows a streamline of a surface at wind velocity of 12.36 m/s, rotation speed of 1006.8 rpm, and tip velocity ratio of 6.4.

Examining the streamline distribution of the blade 140 in FIG. 9, except for partial sections in the direction of the tip, a stall forming at about 80% of the blade 140 may be identified. Afterward, as wind velocity increases, area of stall reduces from the direction of the surface of the tip to the direction of the hub. This may be consider as number of rotations of a blade 140 increase as inflow wind velocity increases, and as a result angle of attack decrease and thus stall reduces. The stall reduces the lift generating in the blade 140 and is a cause for lower output.

Referring to these results, prior blades do not have a uniform width and thickness in the longitudinal direction, and by having an asymmetrical shape, stall region on the surface of a blade is relatively largely formed and torque from lift reduces. In other words, area of a tip of a blade receiving flowing streams of wind generating lift and thrust therefrom is formed small and thus torque of a blade reduces.

But, blades 140 according to the present invention have a small stall area, which reduces output, on the surface, and on the contrary, area of a tip of a blade 140, where flowing streamline generating lift and thrust is received, is largely formed and as a result torque of a blade 140 is improved.

Figure 13:
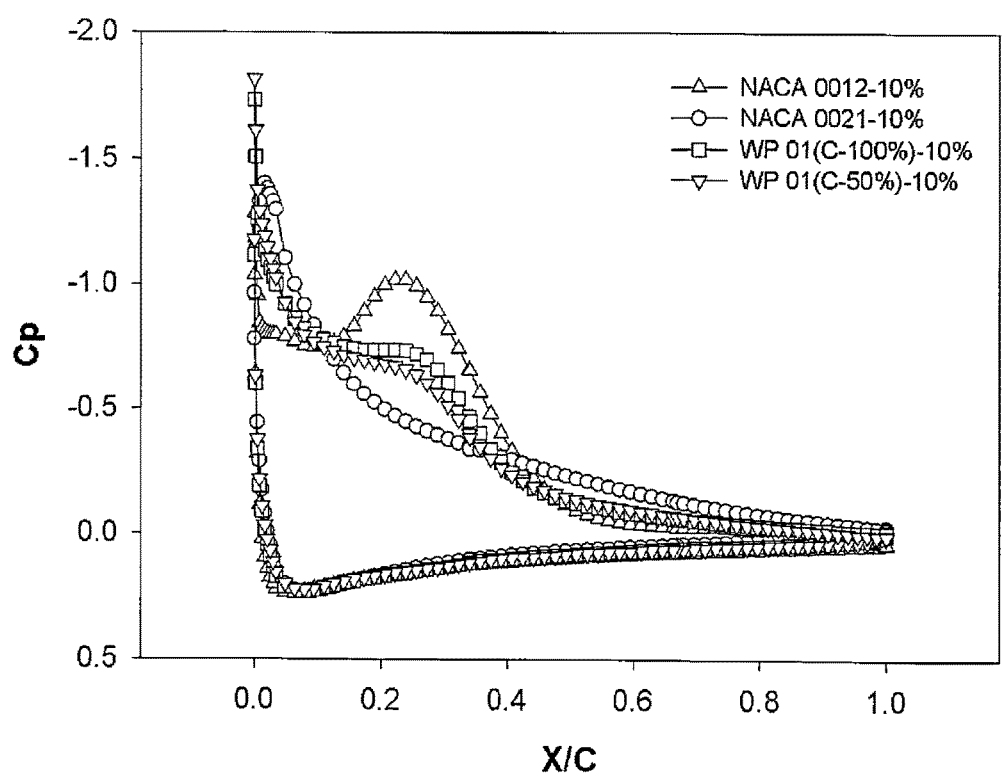
FIG. 13 to FIG. 15 are results of CFD interpretation showing a coefficient distribution according to a position of symmetrical airfoil blades with 4 different shapes having uniform width and thickness.
Figure 14:
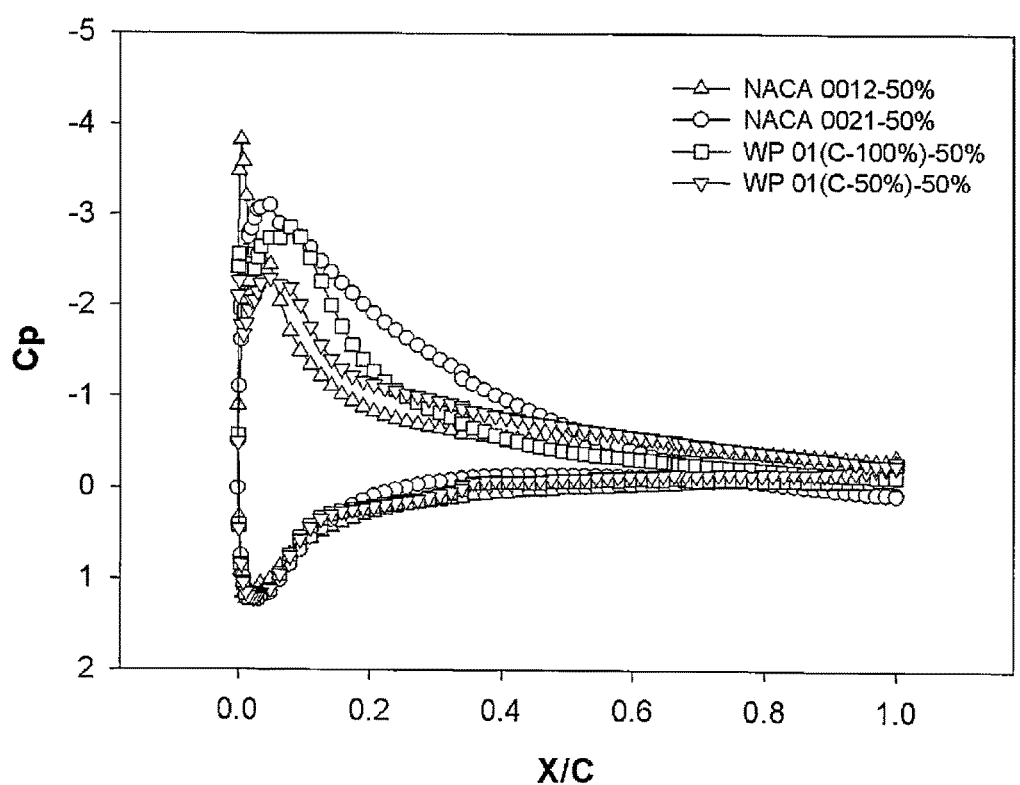
Figure 15:
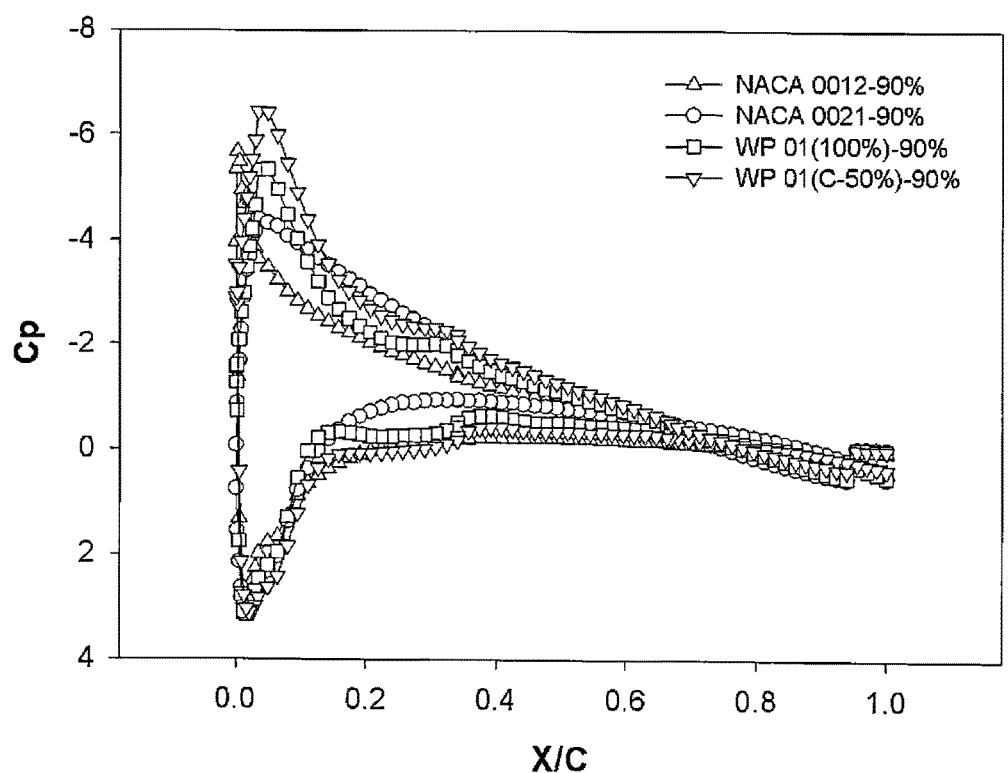

FIG. 13 to FIG. 15 are results of CFD analysis showing coefficient distributions according to positions of symmetrical airfoil blades with 4 different shapes having same width and thickness.

WP-01 of the graph corresponds to embodiment 1, NACA0012 corresponds to embodiment 2, NACA0021 corresponds to embodiment 3. Also, 50% means that it is measured at a location 50% of the length of the blade 140 from a hub of a blade 140 to the tip. Likewise, 10% means that it is measured at a location 10% of the length of the blade 140 from a hub of a blade 140 to the tip, and 90% means that it is measured at a location 90% of the length of the blade 140 from a hub of a blade 140 to the tip.

Examining FIG. 13 to FIG. 15, they are in common in that pressure coefficients converge to 0 as they approach in the direction of a thin part of a blade 140. But, distribution range of absolute values of pressure coefficients according to positions corresponding to 10%, 50%, 90% of a blade 140 in the direction from a hub to a tip have different differences, and values are about −1.8~0.3 for position of 10%, values are about −4.0~1.3 for position of 50%, and values are about −6.8~3.5 for position of 90%.

As can be identified from the results of FIG. 9 to FIG. 12, this shows that rotation power obtained from tip of a blade 140 is an important part of symmetrical airfoil blades 140 having uniform width and thickness.

That is, prior blades are formed in a shape having width and thickness decreasing in respect to the longitudinal direction, and interaction with wind at the tip of a blade is small, and thus little lift and thrust is generated and problems of relatively low torque existed.

Therefore, a blade 140 of the present invention is formed in a shape having uniform width and thickness in respect to longitudinal direction, and rotation power at the tip of a blade 140 is relatively large, and thus lift and thrust is increased and torque is greatly increased. Since increase in torque brings about increase in power generation output and operating efficiency, a more efficient wind power generation system compared to prior arts may be put together from the present invention.

Figure 16:
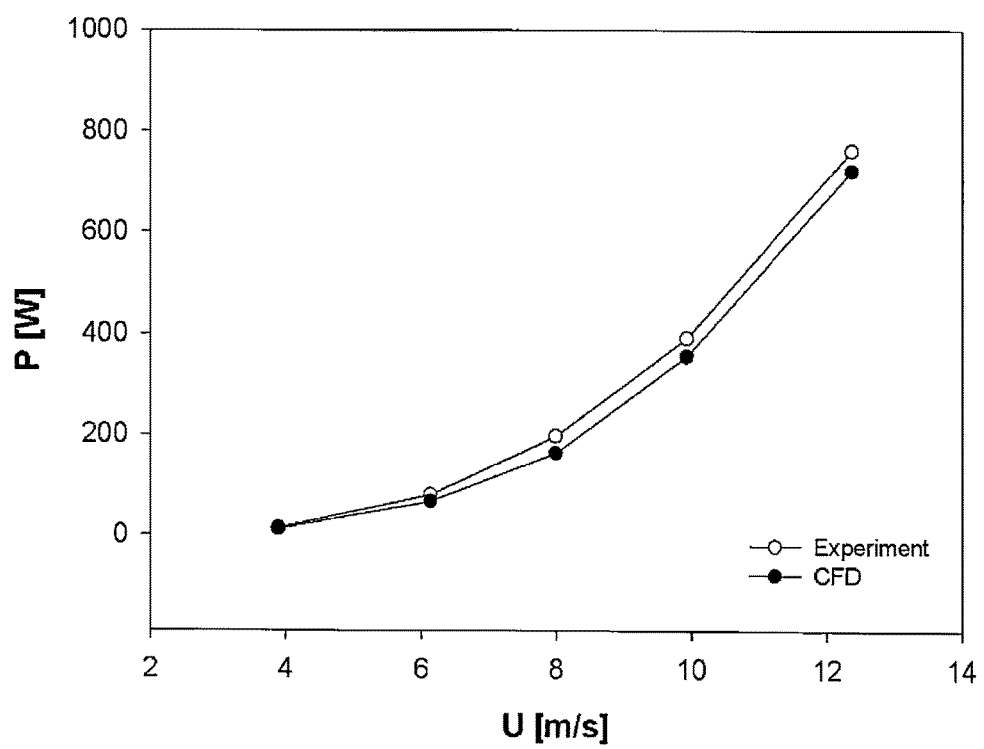
FIG. 16 to FIG. 17 are exemplary views comparing power generation output and efficiency of power conversion according to wind tunnel tests and numerical analysis of CFD.
Figure 17:
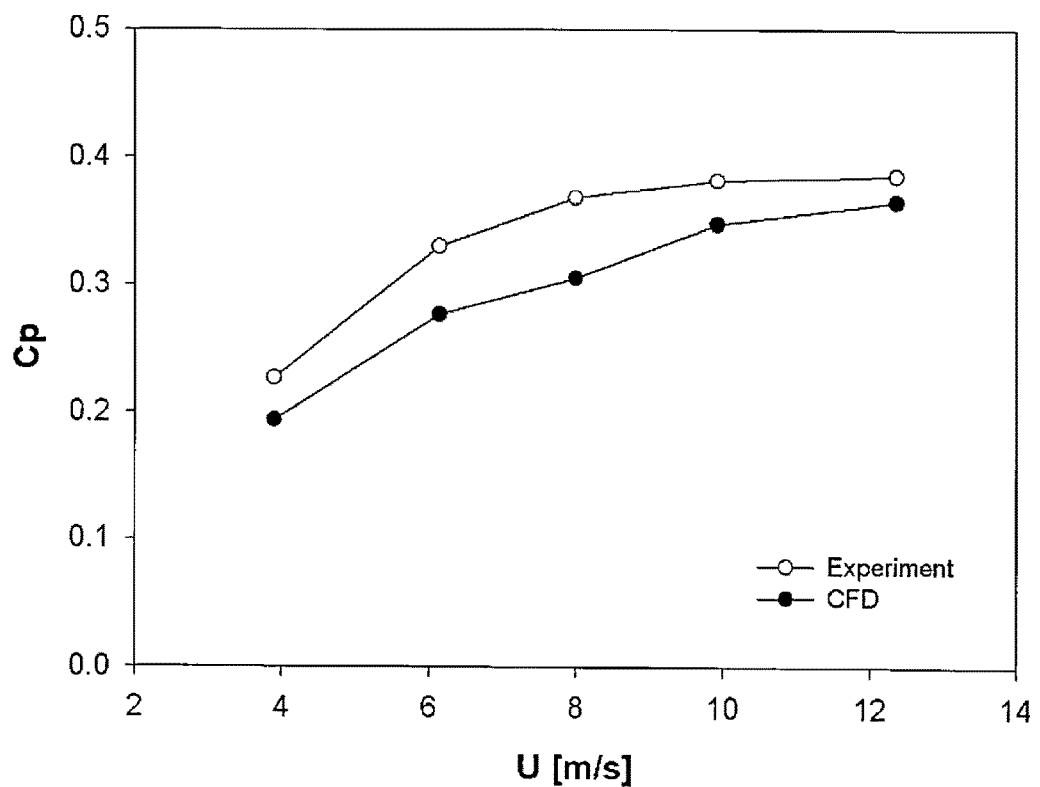

FIG. 16 to FIG. 17 are exemplary views comparing power generation output and efficiency of power conversion according to wind tunnel tests and numerical analysis of CFD.

First examining FIG. 16, power generation output increases as wind velocity increase in both wind tunnel experiment and CFD numerical analysis. And since the numerical values are also very similar, it may be considered that almost no error occurred.

And, examining FIG. 17, which compares efficiency of power conversion (Cp), it may be identified that errors have increased by a small amount unlike the comparison of power generation output, but efficiency of power conversion (Cp) increases according to increase in wind velocity, and shapes of the increasing line are very similar and thus have characteristics of similar efficiency of power conversion (Cp).

Figure 18:
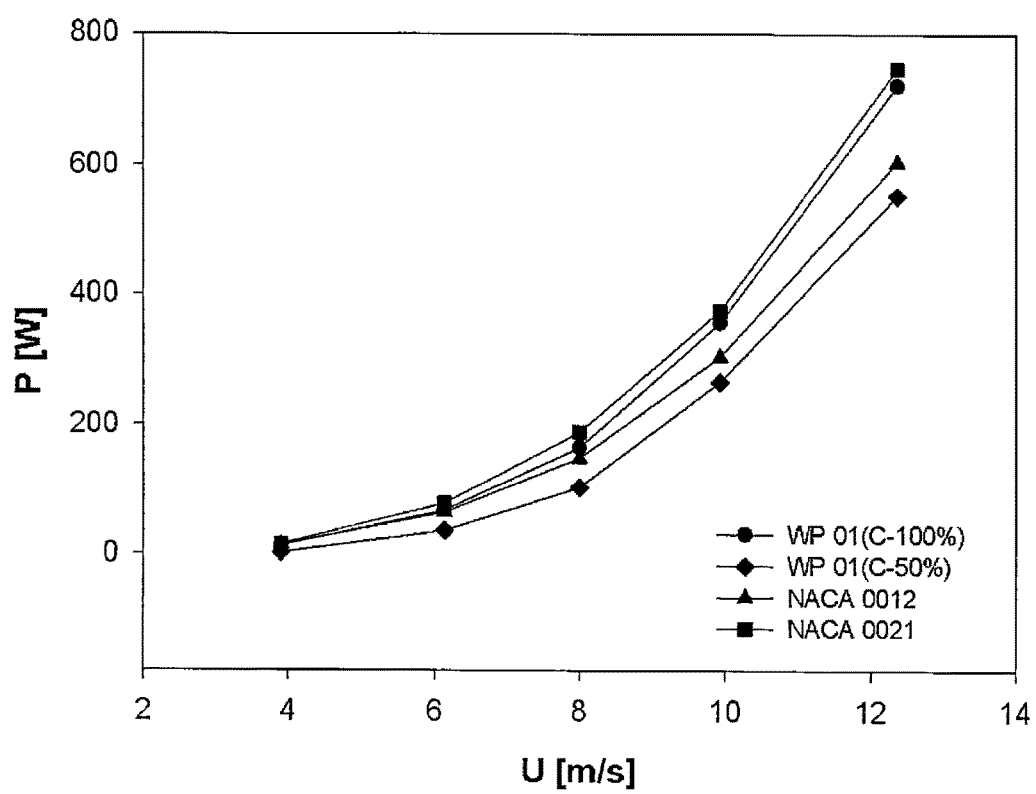
FIG. 18 to FIG. 19 are exemplary views comparing power generation output and efficiency of power conversion according to results of CFD interpretation of symmetrical airfoil blades with 4 different shapes having uniform width and thickness.
Figure 19:
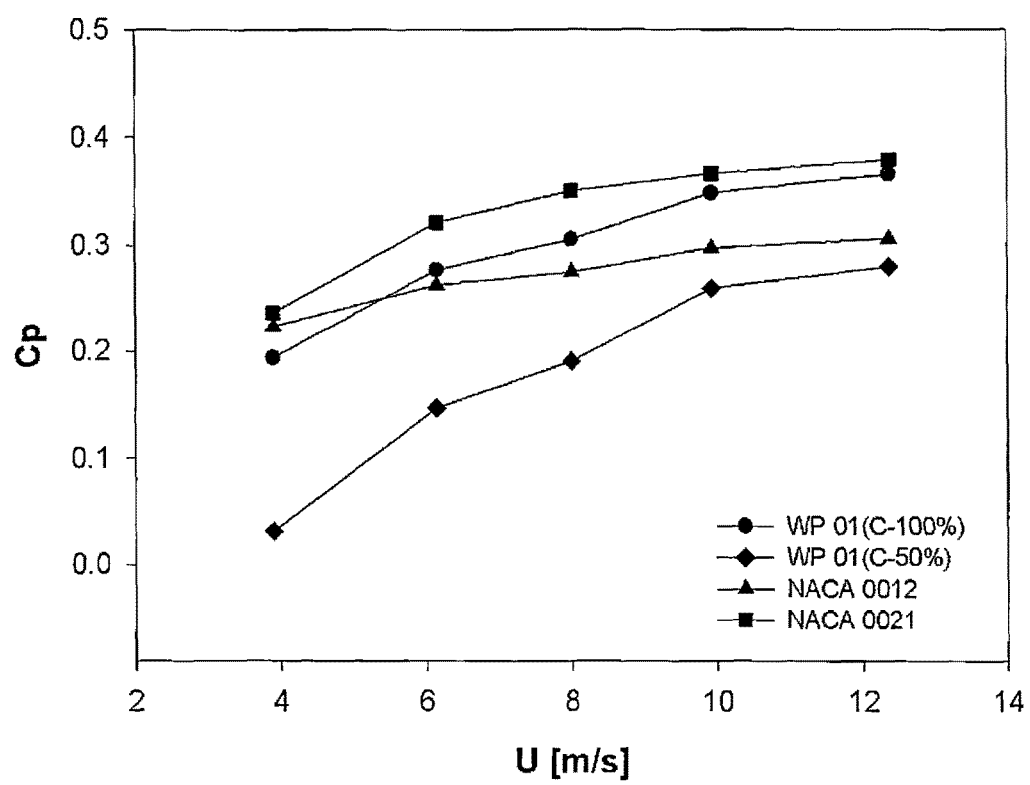

FIG. 18 to FIG. 19 are exemplary views comparing power generation output and efficiency of power conversion according to results of CFD analysis of a symmetrical airfoil blades of 4 different shapes having uniform width and thickness.

First when examining FIG. 18, output increases according to wind velocity, but it may be identified that the size of output is different according to the shape of blade 140. As a result, power generation is high in an order of embodiment 3, embodiment 1, and embodiment 2.

Subsequently, when examining FIG. 19, it may be identified that efficiency of power conversion (Cp) generally displays tendencies of increasing as wind velocity increase. But, efficiency of power conversion (Cp) is generally low in a position corresponding to 50% to the direction of the tip of the blade 140, and efficiency of power conversion (Cp) is high in the order of embodiment 3, embodiment 2, and embodiment 1 at wind velocities below about 5.5 m/s, and efficiency of power conversion (Cp) is high in the order of embodiment 3, embodiment 1, and embodiment 2 at wind velocities above that.

Eventually, blade 140 with the highest power generation output and efficiency of power conversion (Cp) is embodiment 3 from the result of numerical analysis of CFD, and it is considered that the thickness of a blade 140 be adjusted in respect to this.

When result values are examined, performance results of the wind tunnel experiments show power generation output is 761.12 W, efficiency of power conversion (Cp) is 0.385 at vicinity of rated wind velocity of 12.36 m/s, and result of CFD numerical analysis at same wind velocity shows power generation output is 750.50 W, efficiency of power conversion (Cp) is 0.365. Error of 40.62 W in power generation output and 0.02 in efficiency of power conversion (Cp) occurred, and this corresponds to error of less than 5%.

Generators converting mechanical energy, which is generated from rotation of blades 140, to electrical energy not mentioned in the present invention is technology known and/or used by others, are required for producing electrical energy, which is the ultimate objective of wind turbines.

As described above, blades 140 applied to wind turbines are formed having same width and thickness, and is comprised in a shape of a symmetrical airfoil, and thus torque is improved by generation of lift and thrust from both sides of the entire blade 140, and have advantages of having high efficiency of power generation and operating efficiency.

Although some exemplary embodiments have been described herein, these embodiments are given by way of illustration only and do not limit the present invention. It should be understood by those skilled in the art that the described embodiments may be modified and altered without departing from the scope of the invention, and various modifications and alterations can be made within the sprit and the scope of the present invention defined by the appended claims and equivalents thereof.

The invention claimed is:
1. A horizontal-axis wind turbine, comprising:
a tower configured to be erected on a ground surface;
a nacelle configured to attach to the tower and to rotate about a vertical axis;
a rotor configured to couple to the nacelle and to rotate about a horizontal axis;
one or more airfoil blades configured to connect to the rotor,
  wherein each air foil blade of the one or more airfoil blades has a stall region, and a uniform region,
    wherein a width of the uniform region along a length direction of the airfoil blade is uniform, and a thickness of the uniform region along the length direction of the air foil blade is uniform,
    wherein a cross-section of the uniform region has a leading edge, a tail edge, and a chord line connecting the leading edge and the tail edge
    wherein the cross-section has symmetry about the chord line, and
    wherein the cross-section has greatest thickness at a point located between ⅕ to ⅓ on the chord line from the leading edge, and the greatest thickness ranges from 13.33% to 23.33% of a length of the chord line,
  wherein the one or more airfoil blades are configured to achieve a maximum efficiency at a pitch angle of 0° when the rotor rotates at a rotational speed equal to or greater than a threshold rotational speed, and
  wherein the one or more airfoil blades are configured to block a wind blowing onto a surface defined by the one or more airfoil blades and redirect the wind in a circumferential direction of the surface when the pitch angle is 0° and when the rotator rotates at the rotational speed equal to or greater than the threshold rotational speed; and a pitch angle control device configured to adjust a pitch angle of the one or more airfoil blades in a range of 0° to 30°, wherein the pitch angle control device comprises a pitch angle control motor combined with the rotor and a third gear connected to the a pitch angle control motor, transmits power to the blade, and adjusts pitch angle of the blade in response to change in wind velocities, and wherein the pitch angle control device is further configured to:

adjust the pitch angle of the one or more airfoil blades to an angle between 20° and 30° for increasing the rotational speed of the rotor to or beyond the threshold rotational speed, and adjust the pitch angle of the one or more airfoil blades to an angle of 0° for achieving the maximum efficiency when the rotor rotates at the rotational speed equal to or greater than the threshold rotation speed.

2. A horizontal-axis wind turbine using airfoil blades according to claim 1, further comprising a tail wing combined at a back surface of the nacelle and thus generating power in an up wind method, in which wind faces the blade before the tower.

3. The horizontal-axis wind turbine according to claim 1, wherein a leading edge of a direction of rotation of the one or more airfoil blades is a straight line.

4. A horizontal-axis wind turbine, comprising:
a tower configured to be erected on a ground surface;
a nacelle configured to attach to the tower and to rotate about a vertical axis;
a rotor configured to couple to the nacelle and to rotate about a horizontal axis;
one or more airfoil blades configured to connect to the rotor,
wherein each air foil blade of the one or more airfoil blades has a stall region, and a uniform region,
wherein a width of the uniform region along a length direction of the airfoil blade is uniform, and a thickness of the uniform region along the length direction of the air foil blade is uniform,
wherein a cross-section of the uniform region has a leading edge, a tail edge, and a chord line connecting the leading edge and the tail edge
wherein the cross-section has symmetry about the chord line, and
wherein the cross-section has greatest thickness at a point located between ⅕ to ⅓ on the chord line from the leading edge, and the greatest thickness ranges from 13.33% to 23.33% of a length of the chord line,
wherein the one or more airfoil blades are configured to achieve a maximum efficiency at a pitch angle of 0° when the rotor rotates at a rotational speed equal to or greater than a threshold rotational speed, and
wherein the one or more airfoil blades are configured to block a wind blowing onto a surface formed by the one or more airfoil blades and redirect the wind in a circumferential direction of the surface when the pitch angle is 0° and when the rotator rotates at the rotational speed equal to or greater than the threshold rotational speed; and a pitch angle control device configured to adjust a pitch angle of the one or more airfoil blades in a range of 0° to 30°, wherein the pitch angle control device comprises:
a wind velocity panel and a coil spring configured to move in a horizontal lineal motion in response to wind;
a first gear configured to move in a horizontal lineal motion with the wind velocity panel; and
a second gear on a hub of the one or more airfoil blade, wherein the second gear is interlinked with the first gear and moving in a circular motion, and is configured to adjust the pitch angle of the one or more airfoil blade in response to changes in wind velocities,
wherein the pitch angle control device is further configured to:
adjust the pitch angle of the one or more airfoil blades to an angle between 20° and 30° for increasing the rotational speed of the rotor to or beyond the threshold rotational speed, and
adjust the pitch angle of the one or more airfoil blades to an angle of 0° for achieving the maximum efficiency when the rotor rotates at the rotational speed equal to or greater than the threshold rotation speed.

5. A horizontal-axis wind turbine according to claim 4, further comprising a tail wing combined at a back surface of the nacelle and thus generating power in an up wind method, in which wind faces the blade before the tower.

6. The horizontal-axis wind turbine according to claim 4, wherein a leading edge of a direction of rotation of the one or more airfoil blades is a straight line.

* * * * *